Patented Sept. 22, 1931

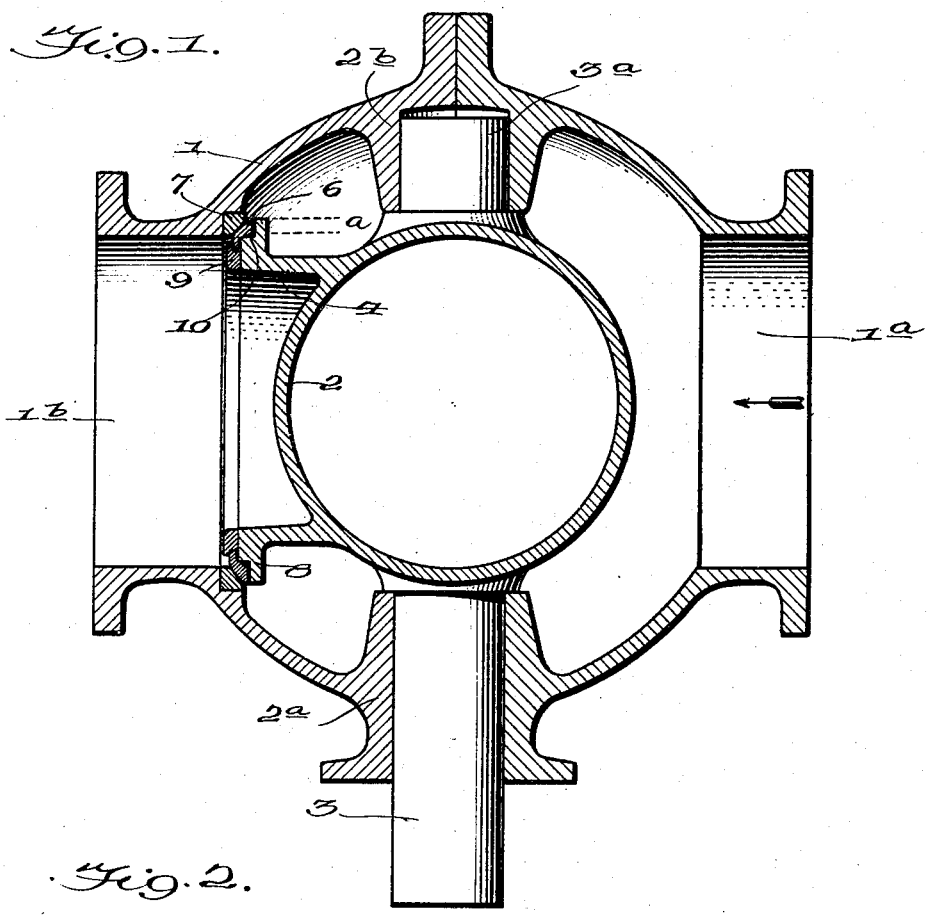
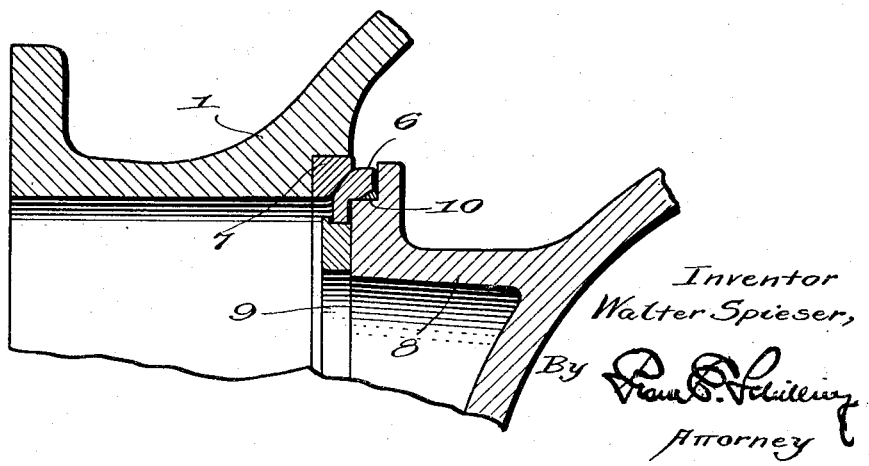

1,824,511

UNITED STATES PATENT OFFICE

WALTER SPIESER, OF ZURICH, SWITZERLAND

ROTARY SLIDE VALVE

Application filed May 11, 1927, Serial No. 190,443, and in Switzerland May 12, 1926.

This invention relates to improvements in rotary valves of that type in which the valve member is provided with a sealing or packing surface subjected to considerable pressure, often to the full pressure of a high-pressure pipe line, and in which pressure balancing or relief means are commonly provided to reduce this pressure. Such valves are generally made of considerable size and difficulty is found in operating the valve because of the amount of the pressure falling upon the sealing or packing surfaces, hence the reason for using some type of pressure balancing or relief means. The use of such pressure balancing or relief means complicates the structure by requiring a special chamber of annular or circular area, formed by a movable ring or plate and a projection therefrom and a steering apparatus to control said chamber. The use of such balancing or relief means also materially increases the price of the valve and reduces its reliability, as during the control of the valve the balanced sealing or packing surface is exposed to the eddies of the liquid stream which causes heavily destructive vibrations of the movable plate or ring.

It is the object of my invention to provide a valve which dispenses not only with the use of the annular chamber mentioned above, but also with any complex balancing or relief constructions, and which valve will close tightly against any pressure and yet may be easily moved to open position.

An embodiment of the invention is shown, by way of example, in the accompanying drawings, in which:—

Figure 1 is a central section through a valve, omitting a part of the valve casing, embodying one form of my invention.

Figure 2 is a fragmentary sectional view showing the arrangement of the packing means.

Referring to the drawings, 1 designates the spherical valve body provided with intake and outlet ports 1$^a$ and 1$^b$ and containing the rotary valve member 2 provided with journals 3 and 3$^a$ mounted in bearings 2$^a$ and 2$^b$ at diametrically opposite sides of the valve body. The journal 3 is longer than the journal 3$^a$ and extends to the exterior of the valve body for the connection therewith of a valve operating handle or other operating means. The bearing through which this longer journal extends is usually packed or of stuffing box structure in order to prevent leakage. This packing or stuffing box feature I have not shown, as it, per se, constitutes no part of the present invention.

The valve member 2 is provided with a projection 4 which carries a sealing means comprising a carrier ring 8 and a clamping ring 9 suitably secured thereto. An axially movable packing member or ring 6 is here clamped at its inner edge between said rings and the outer face of its free portion is properly formed to engage the packing ring 7, fixedly mounted at the side of the casing provided with the port to be controlled. The inner face of said free portion of ring 6 is beveled or inclined to engage a combined backing and packing ring 10 held in a groove in the part 8. The rings 6 and 7 are of restricted width or cross-sectional area and their contact surfaces form a spherical zone with center in the intersection of the axis of the casing 1 with the rotary axle of the valve member 2. The ring 6 has a relative axial movement, i. e., movement in the directions toward and from the ring 7. By this movement the ring 6 is adapted to adjust itself to the surface of ring 7 and to the backing 10 so that a secure sealing engagement will be effected.

It may be observed that by the structure disclosed the closure member 6 in the closed position of the valve is partially subjected to balancing pressure from its outer edge up to the line where the contact between the rings 6 and 7 will be effected. This line may be fixed in Fig. 1 of the drawings by the outer of the dotted lines $a$—$a$, while the cross-sectional range $a$—$a$ itself encloses that part of the movable ring 6 which in the closed position of the valve is directly exposed to the full pressure of the fluid. As can be easily determined, said range $a$—$a$ can be optionally chosen by a suitable design of ring 6 and will be so measured that a perfect tightening of the valve is warranted. Generally, i. e., in all high pressure valves, this range a—a will be very small in comparison with the full pipe line area, and therefore the pressure of the fluid in the shut valve falls mainly upon the valve member 2 and hence will be removed from the packing and transferred to the journals 3 and 3ª.

To choose a localized and reduced pressure on the movable ring 6 sufficient for an efficient sealing action by suitable adjusting of the cross-sectional range a—a, the minimum total pressure required for that purpose must be known. Every manufacturer of slide valves knows for each pipe line diameter the minimum specific pressure sufficient to press the valve plate tight against the casing, i. e., he knows the total pressure required and so it is possible to calculate the range a—a for each pipe line diameter and specific pipe line pressure.

It is evident that in the disclosed structure the pressure applied to the ring 6 is that proportion only from the total pipe line pressure which its effective area a—a bears in proportion to the full pressure bearing area:

The whole remainder of the pipe line pressure is sustained by the valve member 2 and transferred to its journals 3 and 3ª which have—compared with ring 6—not only a very smaller moment of resistance, but as well a remarkably reduced coefficient of friction, so that the control of the valve will be made exceedingly easier. In the described design an easier control is reached without the necessity of using any other balancing or pressure relief means.

It will thus be seen that, in the embodiment disclosed, a sealing connection between the port to be controlled and the movable valve member is provided in which a packing ring is employed which is axially movable, independent of the movement of the valve, so that it will be self-adjusting to its seat against the opposed packing member, whereby a highly efficient type of sealing connection is produced. At the same time it will be seen that the sealing means are constantly balanced with respect to the pressures with the exception—during the closed position of the valve—of a localized region confined to a part of the cross-sectional area of the axially movable packing ring, so that, while a tight sealing connection is secured when the valve is closed no binding of the valve can take place as a result of excessive pressure upon the sealing means and the valve, therefore, is adapted to be opened and closed with ease and facility. The construction is such that the pressure directly applied to the axially movable packing ring is that proportion from the total pipe line pressure which its effective area bears in proportion to the full area of the fluid, so that the remainder of the pressure falls upon the valve member and is sustained by its journals. By this means the use of balancing devices or complex relief means is avoided and rendered entirely unnecessary, thus simplifying and cheapening the cost of construction of the valve and rendering its operation much easier and its reliability greater.

Having thus described my invention, I claim:

A rotary valve comprising a casing, a valve member in the casing, and packing rings of comparatively small cross-sectional area on this valve and casing, one of said rings being axially movable relatively to the other for a sealing action under pressure, a part of the area of said movable ring being in closed position of the valve still directly exposed to the fluid pressure, that part being a proportion of the full pressure bearing area of the valve sufficiently great to secure a perfectly tight closure of the valve.

In testimony whereof I affix my signature.

WALTER SPIESER.